United States Patent
Cai et al.

(10) Patent No.: US 12,121,995 B2
(45) Date of Patent: Oct. 22, 2024

(54) LASER SYSTEM FOR DICING SEMICONDUCTOR STRUCTURE AND OPERATION METHOD THEREOF

(71) Applicant: YANGTZE MEMORY TECHNOLOGIES CO., LTD., Wuhan (CN)

(72) Inventors: Liquan Cai, Wuhan (CN); Peng Chen, Wuhan (CN); Houde Zhou, Wuhan (CN)

(73) Assignee: YANGTZE MEMORY TECHNOLOGIES CO., LTD, Wuhan (CN)

( * ) Notice: Subject to any disclaimer, the term of this patent is extended or adjusted under 35 U.S.C. 154(b) by 728 days.

(21) Appl. No.: 17/307,928

(22) Filed: May 4, 2021

(65) Prior Publication Data

US 2022/0314369 A1  Oct. 6, 2022

Related U.S. Application Data

(63) Continuation of application No. PCT/CN2021/084445, filed on Mar. 31, 2021.

(51) Int. Cl.
*B23K 26/38* (2014.01)
*B23K 26/40* (2014.01)
*B23K 101/40* (2006.01)

(52) U.S. Cl.
CPC .............. *B23K 26/38* (2013.01); *B23K 26/40* (2013.01); *B23K 2101/40* (2018.08)

(58) Field of Classification Search
CPC ..... B23K 2101/40; B23K 26/40; B23K 26/38

USPC ...................................... 219/121.67
See application file for complete search history.

(56) References Cited

U.S. PATENT DOCUMENTS

| 4,278,867 A | * | 7/1981 | Tan | B23K 26/123 |
| | | | | 219/121.64 |
| 4,555,610 A | | 11/1985 | Polad et al. | |
| 5,063,280 A | * | 11/1991 | Inagawa | H05K 3/0038 |
| | | | | 219/121.78 |

(Continued)

FOREIGN PATENT DOCUMENTS

| CN | 1567007 A | 1/2005 |
| CN | 1577755 A | 2/2005 |

(Continued)

OTHER PUBLICATIONS

International Search Report issued in corresponding International Application No. PCT/CN2021/084445, mailed Jan. 10, 2022, 4 pages.

(Continued)

*Primary Examiner* — Jimmy Chou
(74) *Attorney, Agent, or Firm* — Bayes PLLC (57) ABSTRACT

A laser system for dicing a semiconductor structure is disclosed. The laser system includes a laser source and a laser energy adjusting unit. The laser source is configured to generate a laser. The laser energy adjusting unit is movably provided on a laser light path between the laser source and the semiconductor structure. The laser energy adjusting unit is moved to the laser light path between the laser source and the semiconductor structure based on a first determination that the laser source is focused on a first preset region of the semiconductor structure having a first material.

20 Claims, 10 Drawing Sheets

(56) References Cited

U.S. PATENT DOCUMENTS

| | | | |
|---|---|---|---|
| 5,278,385 A | 1/1994 | Gerome et al. | |
| 5,302,798 A * | 4/1994 | Inagawa | B23K 26/382 |
| | | | 219/121.77 |
| 6,369,356 B1 * | 4/2002 | Beck | G01J 1/4257 |
| | | | 219/121.72 |
| 6,649,861 B2 * | 11/2003 | Duignan | B23K 15/0006 |
| | | | 219/121.68 |
| 6,720,519 B2 * | 4/2004 | Liu | B23K 26/067 |
| | | | 219/121.75 |
| 7,709,768 B2 * | 5/2010 | Sercel | B23K 26/40 |
| | | | 219/121.75 |
| 9,842,740 B2 * | 12/2017 | Mastain | B23K 26/032 |
| 10,688,599 B2 * | 6/2020 | Liu | B23K 26/0617 |
| 10,730,783 B2 * | 8/2020 | Akarapu | C03B 33/082 |
| 2001/0054606 A1 | 12/2001 | Weishauss et al. | |
| 2003/0006221 A1 * | 1/2003 | Hong | H01L 21/3043 |
| | | | 219/121.72 |
| 2004/0252291 A1 | 12/2004 | Schutze | |
| 2005/0184036 A1 * | 8/2005 | Hunter | B23K 26/046 |
| | | | 219/121.61 |
| 2007/0193984 A1 * | 8/2007 | Kawai | B23K 26/0884 |
| | | | 219/121.75 |
| 2008/0116183 A1 * | 5/2008 | Curry | B23K 26/083 |
| | | | 219/121.75 |
| 2008/0129950 A1 * | 6/2008 | Abe | G02F 1/1309 |
| | | | 349/192 |
| 2008/0220590 A1 | 9/2008 | Miller et al. | |
| 2010/0108648 A1 * | 5/2010 | Koseki | B23K 26/12 |
| | | | 219/121.84 |
| 2011/0136265 A1 * | 6/2011 | Shigenobu | H01L 31/208 |
| | | | 438/4 |
| 2011/0233178 A1 * | 9/2011 | Cheng | H01L 21/67092 |
| | | | 219/121.72 |
| 2011/0290769 A1 * | 12/2011 | Furuta | B23K 26/40 |
| | | | 219/121.72 |
| 2012/0024829 A1 * | 2/2012 | Huang | B23K 26/355 |
| | | | 219/121.68 |
| 2012/0111310 A1 * | 5/2012 | Ryu | C03B 33/091 |
| | | | 125/30.01 |
| 2012/0325784 A1 * | 12/2012 | Moffatt | B23K 26/354 |
| | | | 219/121.61 |
| 2013/0051409 A1 * | 2/2013 | Grapov | G02B 27/144 |
| | | | 372/6 |
| 2013/0134142 A1 * | 5/2013 | Morikazu | B23K 26/073 |
| | | | 219/121.75 |
| 2014/0083986 A1 * | 3/2014 | Zhang | B23K 26/40 |
| | | | 219/121.68 |
| 2014/0245608 A1 | 9/2014 | Morimoto et al. | |
| 2014/0256161 A1 * | 9/2014 | Li | B23K 26/352 |
| | | | 438/795 |
| 2014/0291304 A1 * | 10/2014 | Mudd, II | B23K 26/20 |
| | | | 219/121.64 |
| 2015/0060421 A1 * | 3/2015 | Tami | B23K 26/0853 |
| | | | 219/121.77 |
| 2015/0144607 A1 * | 5/2015 | Gesuita | B23K 26/1462 |
| | | | 219/121.67 |
| 2015/0217402 A1 * | 8/2015 | Hesse | B23K 26/08 |
| | | | 219/121.72 |
| 2016/0001402 A1 * | 1/2016 | Martinsen | G02B 26/105 |
| | | | 219/121.68 |
| 2016/0372349 A1 * | 12/2016 | Hyakumura | B23K 26/046 |
| 2017/0320165 A1 * | 11/2017 | Hyakumura | B23K 26/046 |
| 2019/0151997 A1 * | 5/2019 | Blázquez-Sanchez | |
| | | | B23K 26/0648 |
| 2019/0193197 A1 * | 6/2019 | Ishikawa | B23K 26/0853 |
| 2019/0224778 A1 | 7/2019 | Murphy et al. | |
| 2019/0262939 A1 * | 8/2019 | Hesse | B23K 26/0613 |
| 2019/0375051 A1 * | 12/2019 | Regaard | B23K 26/38 |
| 2020/0189029 A1 * | 6/2020 | Ishiguro | B23K 26/0734 |
| 2020/0214138 A1 * | 7/2020 | Arai | H05K 3/0038 |
| 2021/0107091 A1 * | 4/2021 | Riechel | B23K 26/0624 |
| 2022/0319888 A1 * | 10/2022 | Cai | B23K 26/38 |
| 2023/0061635 A1 * | 3/2023 | Riechel | B23K 26/06 |
| 2023/0226640 A1 * | 7/2023 | Heinrici | B23K 26/0648 |
| | | | 219/121.75 |
| 2023/0415261 A1 * | 12/2023 | Oguchi | B23K 26/38 |
| 2024/0033858 A1 * | 2/2024 | Haas | B23K 26/0648 |

FOREIGN PATENT DOCUMENTS

| | | |
|---|---|---|
| CN | 101318264 A | 12/2008 |
| CN | 1577755 B | 5/2010 |
| CN | 102822952 A | 12/2012 |
| CN | 103567630 A | 2/2014 |
| CN | 103934576 A | 7/2014 |
| CN | 203980014 U | 12/2014 |
| CN | 104411446 A | 3/2015 |
| CN | 105345282 A | 2/2016 |
| CN | 106735876 A | 5/2017 |
| CN | 106938370 A | 7/2017 |
| CN | 108080798 A | 5/2018 |
| CN | 108515273 A | 9/2018 |
| CN | 108701678 A | 10/2018 |
| CN | 110014227 A | 7/2019 |
| CN | 110064841 A | 7/2019 |
| CN | 110102879 A | 8/2019 |
| CN | 111940892 A | 11/2020 |
| JP | 2005118832 A | 5/2005 |
| JP | 2007266420 A | 10/2007 |

OTHER PUBLICATIONS

International Search Report issued in corresponding International Application No. PCT/CN2021/084412, mailed Dec. 30, 2021, 5 pages.

* cited by examiner

```
┌─────────────────────────────────────────────────────────────────┐
│ Providing a laser energy adjusting unit movably equipped on a   │──── 902
│ laser light path between the laser source and the wafer          │
└─────────────────────────────────────────────────────────────────┘
                                │
                                ▼
┌─────────────────────────────────────────────────────────────────┐
│ Changing a position of the laser energy adjusting unit to the   │──── 904
│ laser light path or away from the laser light path based on a   │
│ determination of a material on the wafer along the cutting      │
│ street                                                           │
└─────────────────────────────────────────────────────────────────┘
                                │
                                ▼
┌─────────────────────────────────────────────────────────────────┐
│ Forming a trench on the wafer by the laser source along the     │──── 906
│ cutting street                                                   │
└─────────────────────────────────────────────────────────────────┘
                                │
                                ▼
┌─────────────────────────────────────────────────────────────────┐
│ Performing a mechanical cutting on the wafer along the cutting  │──── 908
│ street having the trench formed by the laser source             │
└─────────────────────────────────────────────────────────────────┘
```

LASER SYSTEM FOR DICING SEMICONDUCTOR STRUCTURE AND OPERATION METHOD THEREOF

CROSS-REFERENCE TO RELATED APPLICATIONS

This application is a continuation of International Application No. PCT/CN2021/084445, filed on Mar. 31, 2021, entitled "LASER SYSTEM FOR DICING SEMICONDUCTOR STRUCTURE AND OPERATION METHOD THEREOF," which is hereby incorporated by reference in its entirety. This application is also related to U.S. application Ser. No. 17/307,944, filed on May 4, 2021, entitled "LASER DICING SYSTEM AND METHOD FOR DICING SEMICONDUCTOR STRUCTURE," which is hereby incorporated by reference in its entirety.

BACKGROUND

The present disclosure relates to laser systems for dicing a semiconductor structure and operation methods thereof.

In semiconductor manufacturing, wafers or semiconductor structures are diced to separate dies that form integrated circuits. Common ways to dice wafers include mechanical sawing and laser dicing. The mechanical sawing methods often include employing a dicing saw to mechanically separate different dies in a wafer. The laser dicing methods often include directing the output of an ultra-short and pulsed high-power laser through optics. The mechanical sawing and the laser dicing may also be combined to separate dies. A dicing process can produce individual circuit chips that are further packaged to form desired circuits.

SUMMARY

Laser systems for dicing a semiconductor structure and operation methods are disclosed herein.

In one aspect, a laser system for dicing a semiconductor structure is disclosed. The laser system includes a laser source and a laser energy adjusting unit. The laser source is configured to generate laser. The laser energy adjusting unit is movably provided on a laser light path between the laser source and the semiconductor structure. The laser energy adjusting unit is moved to the laser light path between the laser source and the semiconductor structure based on a first determination that the laser source is focused on a first preset region of the semiconductor structure having a first material.

In another aspect, a laser system for dicing a semiconductor structure is disclosed. The laser system includes a laser source, a splitter, and a laser energy adjusting unit. The laser source is configured to generate laser. The splitter splits the laser source into a plurality of split laser sources, and the plurality of split laser sources include a first split laser source and a second split laser source. The laser energy adjusting unit is movably provided on a first laser light path between the first split laser source and the semiconductor structure. The first split laser source generates a first dicing energy irradiated on the semiconductor structure along a first track, the second split laser source generates a second dicing energy irradiated on the semiconductor structure along a second track parallel to the first track, and the first track and the second track are located in a cutting street. The first dicing energy irradiated on the semiconductor structure along the first track is adjustable.

In still another aspect, a method for dicing a wafer is disclosed. A trench is formed on the wafer by a laser source along a cutting street. An output energy of the laser source maintains the same when dicing the wafer along the cutting street, and a dicing energy irradiated on the wafer is adjustable when dicing the wafer along the cutting street. A mechanical cutting is performed on the wafer along the cutting street having the trench formed by the laser source.

BRIEF DESCRIPTION OF THE DRAWINGS

The accompanying drawings, which are incorporated herein and form a part of the specification, illustrate aspects of the present disclosure and, together with the description, further serve to explain the present disclosure and to enable a person skilled in the pertinent art to make and use the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present discloses.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The laser grooving process is performed to remove the metal or other complex materials on the cutting street, or called cutting channel, and ensure the consistency of the physical cutting environment of a subsequent mechanical cutting. The laser grooving process could reduce the reliability problems caused by chip collapse and improve the packaging yield of the integrated circuits.

Figure 1:
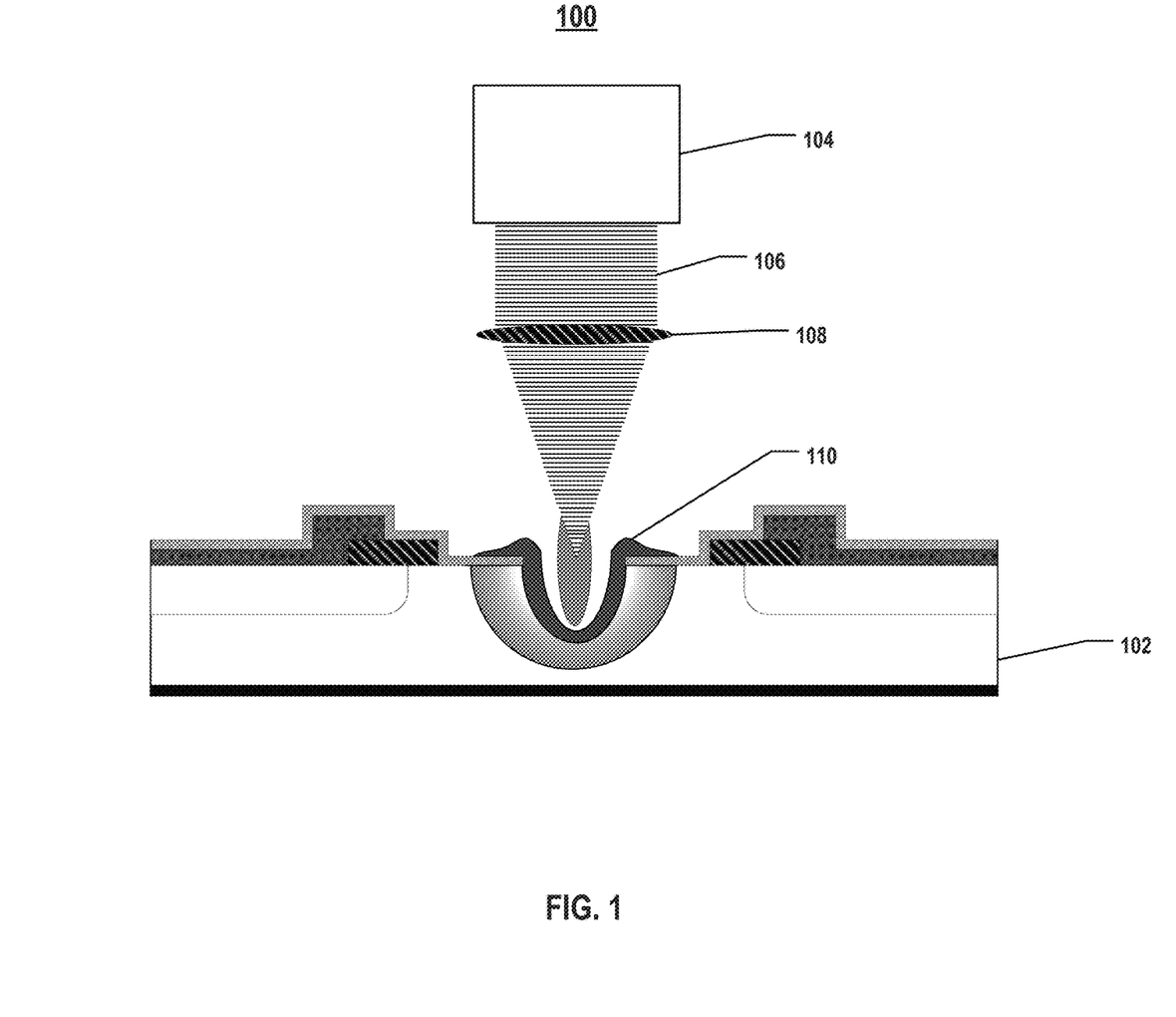
FIG. 1 illustrates a schematic diagram of an exemplary laser system for dicing a semiconductor structure, according to some implementations of the present disclosure.

FIG. 1 illustrates a schematic diagram of an exemplary laser system 100 for dicing a semiconductor structure 102, according to some implementations of the present disclosure. Laser system 100 includes a laser source 104 and a focusing unit 108. Laser source 104 may be any suitable type of laser source including, but not limited to, fiber lasers, solid-state lasers, gas lasers, and semiconductor lasers. Laser source 104 can be configured to generate a laser beam 106 that includes one or a series of pulsed lasers at any suitable wavelengths, which should be a permeable wavelength not strongly absorbed or reflected by semiconductor structure 102. In the case of silicon wafer cutting, the wavelength may be longer than 1 μm to realize the internal laser ablation, making full use of the laser energy and avoiding any damage to the upper part of the wafer when a focused laser beam creates a dicing track inside semiconductor structure 102.

In some implementations, laser beam 106 generated by laser source 104 may have a single wavelength or a plurality of wavelengths, such as two or three different wavelengths. Laser beam 106 having different wavelengths may be separately, simultaneously, or alternatingly generated. In some implementations, the wavelength of the laser beam 106 generated by laser source 104 may be longer than 1 μm. In some implementations, the output frequency of laser source 104 is between 10 kHz and 1,000 kHz. In some implementations, the average output power of laser source 104 is between 5 W and 500 W. It is understood that the parameters of laser beam 106 and laser source 104 disclosed above are for illustrative purposes only and not for limiting.

Focusing unit 108 may be optically coupled to laser source 104 to provide a series of focused laser spots on semiconductor structure 102 based on the series of pulsed lasers generated by laser source 104. For example, the series of pulsed lasers can form a series of focused laser spots at a horizontal location on a focal plane. In some implementations, focusing unit 108 may be operatively coupled to a controller and receives control signals and instructions from the controller. In some implementations, focusing unit 108 may further include any other suitable scanning units, scanning mirrors, and scanning refractive optics.

Focusing unit 108 may be configured to focus each of the laser beam 106 to form a series of focused laser spots. In some implementations, focusing unit 108 may include one or more focusing lens through which the focal plane of the laser beam 106 is determined at a desired position along the z-axis (e.g., the vertical direction). In some implementations, the one or more focusing lenses are electrically and mechanically coupled to the controller to control the arrangement (e.g., orientation and distance in between) of the one or more focusing lens to allow the focal plane of laser beam 106 to be located at the desired position along the z-axis. The series of focused laser spots can be formed on the focal plane, forming ablation structures 110 in semiconductor structure 102.

In some implementations, a dimension of each of the focused laser spots is between 0.2 μm and 5 μm, such as 0.2 μm, 0.5 μm, 1 μm, 2 μm, 3 μm, 4 μm, 5 μm, any range bounded by the lower end by any of these values, or in any range defined by any two of these values. The shape of each focused laser spot can include, for example, round, rectangle, square, irregular, or any suitable shapes. In some implementations, each focused laser spot has a substantially round shape with a diameter between 1 μm and 5 μm. It is understood that the dimensions of a series of focused laser spots can be substantially the same or different. By focusing the beams of laser beam 106 into focused laser spots, the energy density can be significantly increased.

Figure 2:
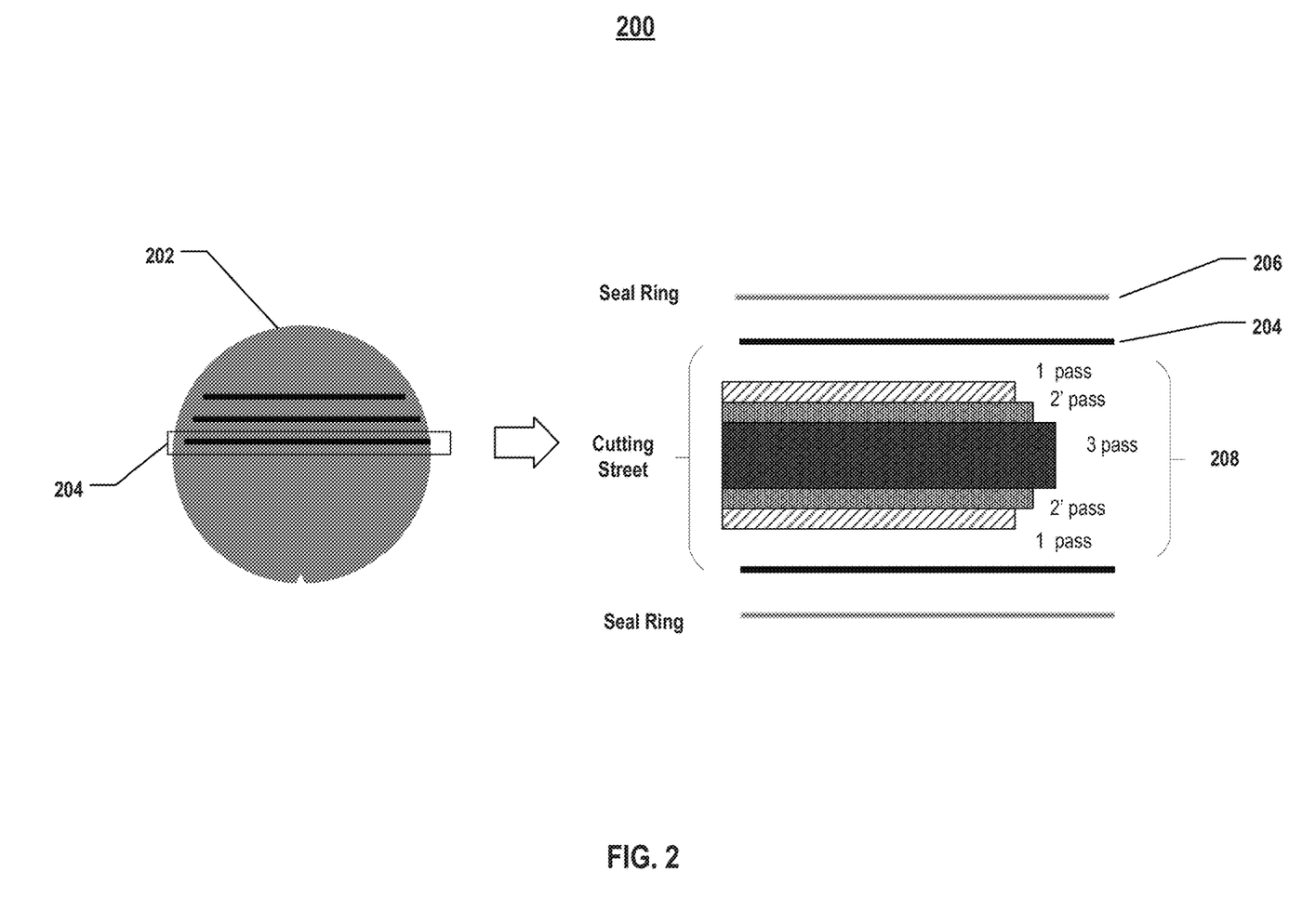
FIG. 2 illustrates a top view of an exemplary cutting street formed on a semiconductor structure, according to some implementations of the present disclosure.
Figure 3:
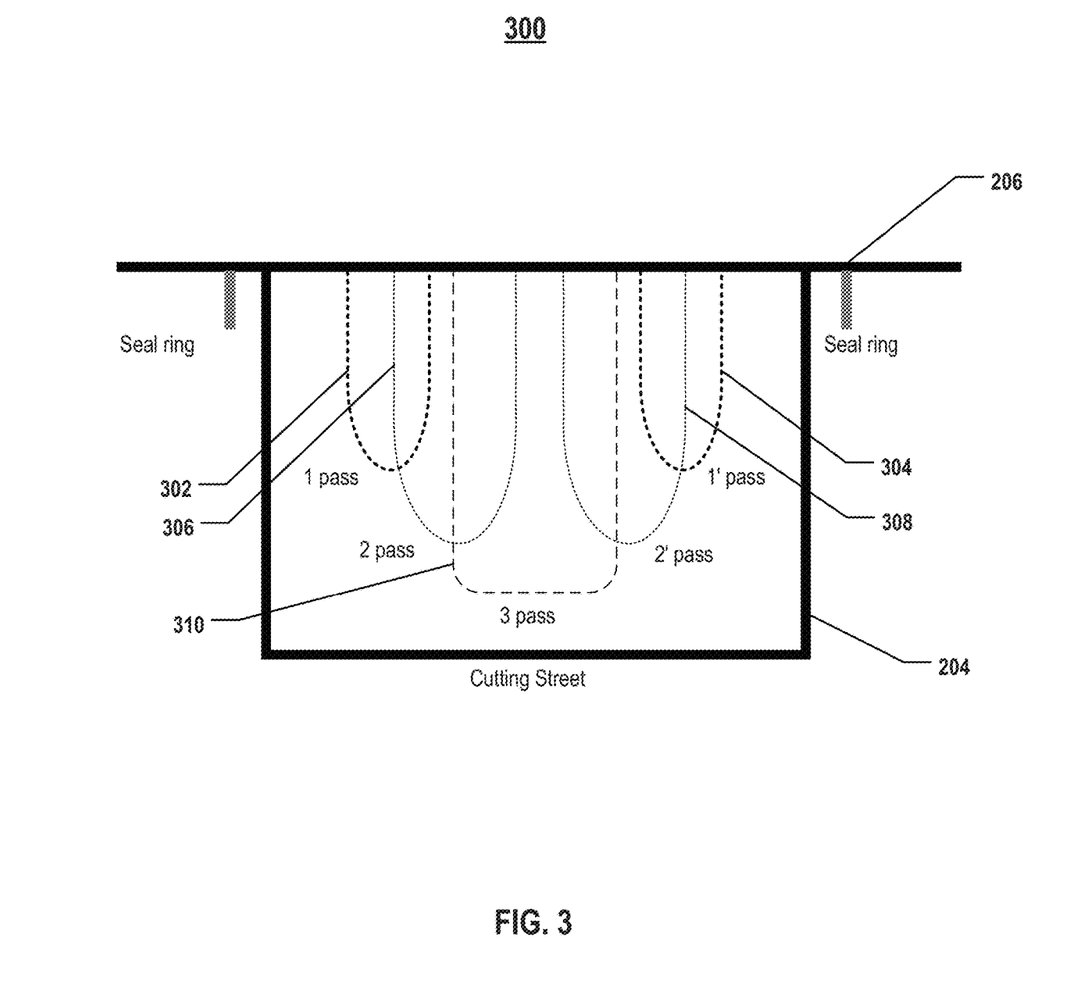
FIG. 3 illustrates a cross-section of an exemplary cutting street formed on a semiconductor structure, according to some implementations of the present disclosure.

FIG. 2 illustrates a top view 200 of an exemplary cutting street 204 formed on a semiconductor structure 202, according to some implementations of the present disclosure. FIG. 3 illustrates a cross-section 300 of cutting street 204 formed on semiconductor structure 202, according to some implementations of the present disclosure. For the purpose of better explaining the present disclosure, top view 200 of cutting street 204 in FIG. 2 and cross-section 300 of cutting street 204 in FIG. 3 will be described together. In some implementations, semiconductor structure 202 may be a wafer. In some implementations, the chips on semiconductor structure 202 are surrounded by seal rings 206, and cutting street 204 is used to dice semiconductor structure 202 without damaging seal rings 206. In some implementations, seal rings 206 may include metal materials.

When performing the laser dicing, a plurality of laser sources may generate a plurality of dicing laser energy, and the dicing energy may be irradiated on semiconductor structure 202 sequentially. As shown in FIG. 2, a laser dicing track 208 may include a plurality of laser tracks performed by a plurality of laser sources sequentially. It is understood that the plurality of laser sources may be applied simultaneously on semiconductor structure 202 based on different designs of the dicing system. By controlling the movement of laser source 104 and focusing unit 108 in FIG. 1, laser dicing track 208 may be limited in the range of cutting street 204 without damaging seal rings 206.

In some implementations, laser dicing track 208 may be formed by laser tracks 302, 304, 306, 308, and 310, as shown in FIG. 3. In some implementations, laser tracks 302 and 304 may be formed by two laser sources having the same energy. In some implementations, laser tracks 302 and 304 may be formed by two laser sources having different energies. In some implementations, laser tracks 302 and 304 may be formed by a same laser source sequentially. In some implementations, laser tracks 302 and 304 may be formed by a same laser source simultaneously. In some implementations, laser tracks 302 and 304 may be formed by a same laser source split by a splitter simultaneously. In some implementations, laser tracks 306 and 308 may be formed by two laser sources having the same energy. In some implementations, laser tracks 306 and 308 may be formed by two laser sources having different energies. In some implementations, laser tracks 306 and 308 may be formed by a same laser source sequentially. In some implementations, laser tracks 306 and 308 may be formed by a same laser source simultaneously. In some implementations, laser tracks 306 and 308 may be formed by a same laser source split by a splitter simultaneously.

In some implementations, laser track 310 is deeper than laser tracks 306 and 308. In some implementations, laser tracks 306 and 308 are deeper than laser tracks 302 and 304. As shown in FIG. 3, the combination of the plurality of laser tracks 302, 304, 306, 308, and 310 forms a trench, and the mechanical cutting may be later performed on semiconductor structure 202 along the cutting street having the trench.

Figure 4:
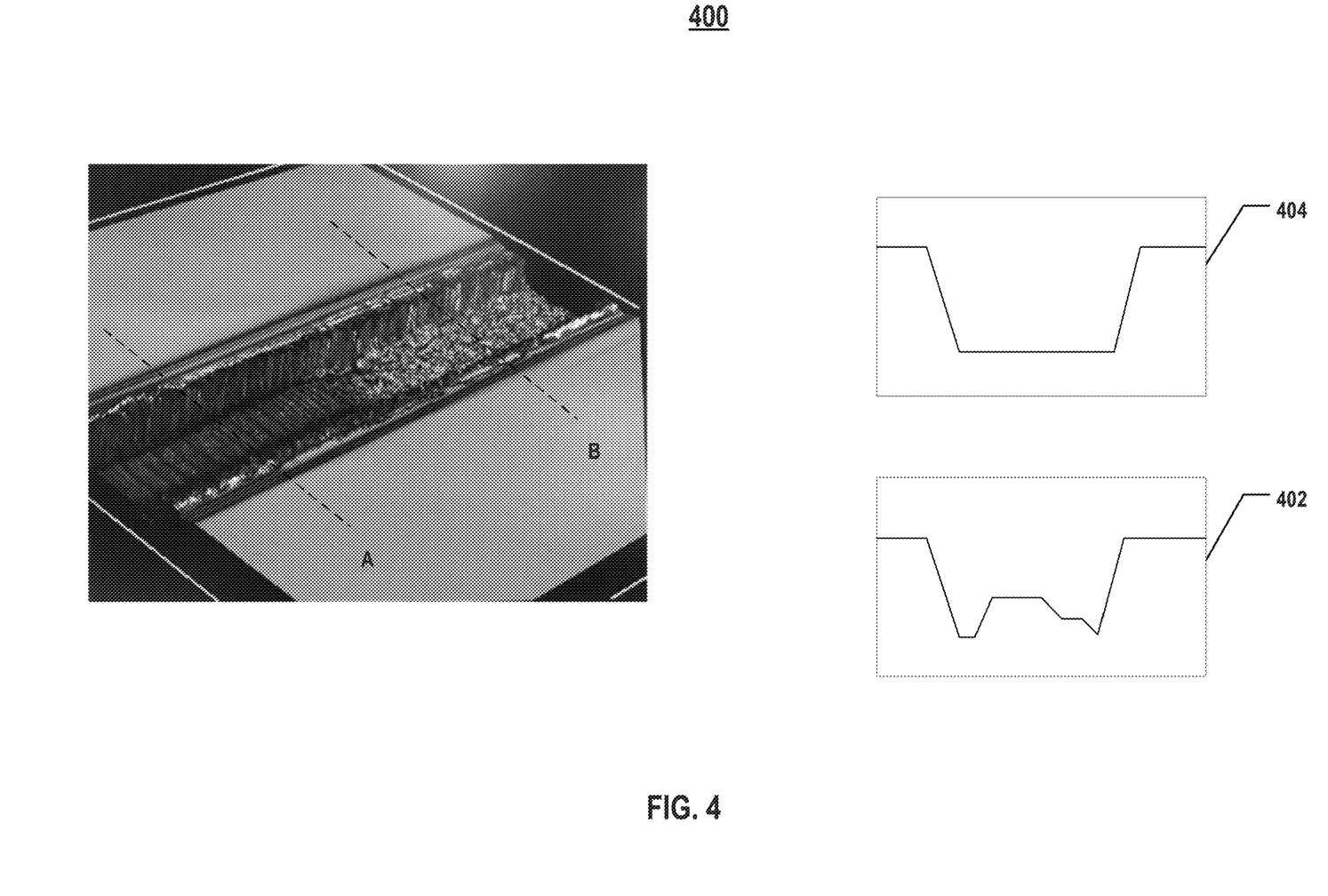
FIG. 4 illustrates a scanning electron microscope image showing a cross-section of an exemplary cutting street formed on a semiconductor structure, according to some implementations of the present disclosure.

FIG. 4 illustrates a scanning electron microscope image 400 showing a cross-section of cutting street 204 formed on semiconductor structure 202, according to some implementations of the present disclosure. Due to the materials formed on different positions of semiconductor structure 202 are various, cutting street 204 may extend along a line having different materials. For example, semiconductor structure 202 is a wafer, and cutting street 204 may cross a plurality of areas having different metal material, different dielectric materials, or other materials. When using laser source 104 to perform the laser dicing, cutting street 204 may have different depths or rough profiles.

A cross-section 402 along line A across cutting street 204 and a cross-section 404 along line B across cutting street 204 are shown in FIG. 4. Line A across cutting street 204 may be located at a position having hard metal material or having several different metal materials, and line B across cutting street 204 may be located at a position having soft metal material or non-metal materials. As shown in FIG. 4, cross-section 402 has a rough profile, and the depth of cross-section 402 is shallower than the depth of cross-section 404.

Figure 5:
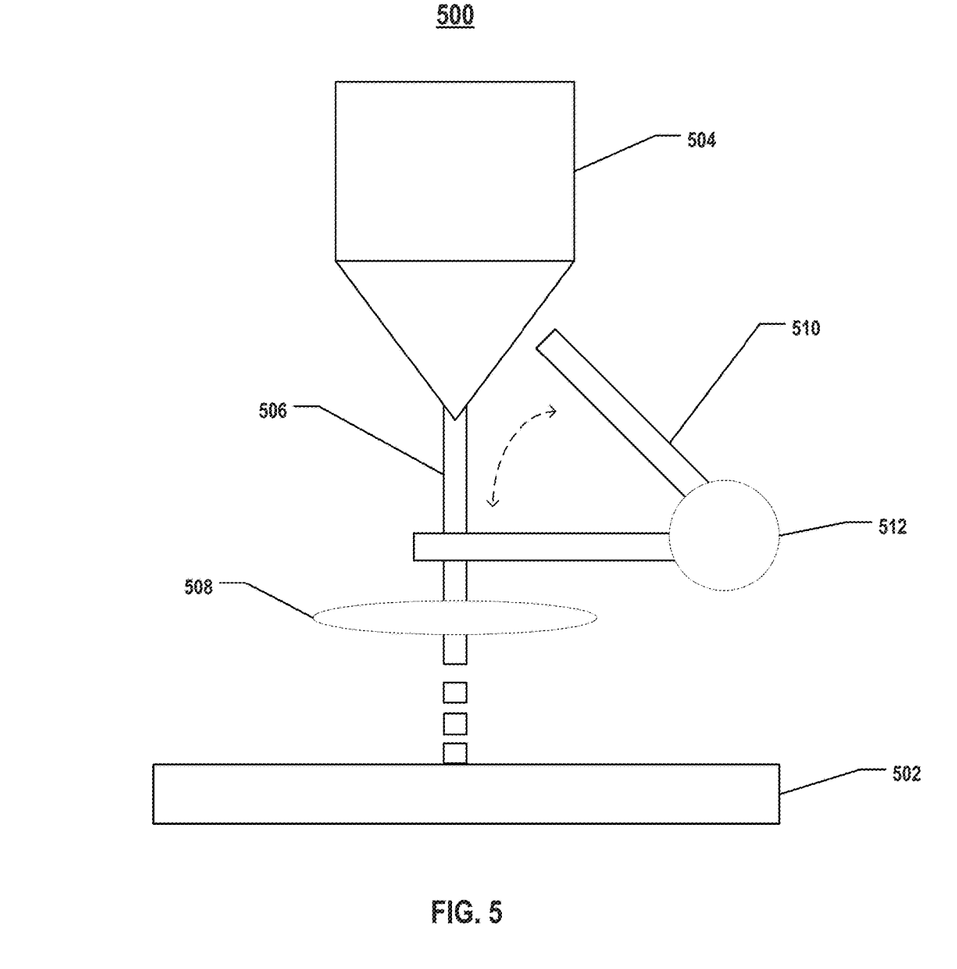
FIG. 5 illustrates a diagram of another exemplary laser system for dicing a semiconductor structure, according to some implementations of the present disclosure.

FIG. 5 illustrates a diagram of a laser system 500 for dicing a semiconductor structure 502, according to some implementations of the present disclosure. Laser system 500 includes a laser source 504, a laser energy adjusting unit 510, a positioning unit 512, and a focusing unit 508. Laser source 504 may be any suitable type of laser source including, but not limited to, fiber lasers, solid-state lasers, gas lasers, and semiconductor lasers. Laser source 504 can be configured to generate a laser beam 506 that includes a series of pulsed lasers at any suitable wavelengths, which should be a permeable wavelength not strongly absorbed or reflected by semiconductor structure 502.

Laser energy adjusting unit 510 may be movably provided on a laser light path between laser source 504 and the semiconductor structure 502. Laser energy adjusting unit 510 is provided to reduce or weaken the laser energy on the laser path. In some implementations, laser energy adjusting unit 510 may be a filter capable of reducing the laser energy output by laser source 504 and irradiated on semiconductor structure 502. In some implementations, laser energy adjusting unit 510 may be a plurality of filters, and the filters may be provided separately or together to generate a gradient transitional dicing energy irradiated on semiconductor structure 502. In some implementations, laser energy adjusting unit 510 may be an optical device providing an additional laser light path. By providing the additional laser light path, the laser light path between laser source 504 and the semiconductor structure 502 is extended. In a situation that the laser energy output by laser source 504 is the same, the total laser light path between laser source 504 and the semiconductor structure 502 is extended, and therefore the laser energy irradiated on semiconductor structure 502 is weakened. In some implementations, laser energy adjusting unit 510 may be a shelter, e.g., a mask or an optical grate, that may block a portion of laser beam 506 to weaken the laser energy irradiated on semiconductor structure 502.

Positioning unit 512 is configured to move laser energy adjusting unit 510 to the laser light path or move laser energy adjusting unit 510 away from the laser light path. In some implementations, positioning unit 512 may be a motor rotationally moving laser energy adjusting unit 510 to or away from the laser light path. In some implementations, positioning unit 512 may be a shutter mechanism slidably moving laser energy adjusting unit 510 to or away from the laser light path.

Focusing unit 508 may be configured to focus laser beam 506 to form a series of focused laser spots. In some implementations, focusing unit 508 may include one or more focusing lens through which the focal plane of the laser beam 506 is determined at a desired position along the z-axis (e.g., the vertical direction). In some implementations, the one or more focusing lenses are electrically and mechanically coupled to the controller to control the arrangement (e.g., orientation and distance in between) of the one or more focusing lens to allow the focal plane of laser beam 506 to be located at the desired position along the z-axis. The series of focused laser spots can be formed on the focal plane, forming dicing trenches in semiconductor structure 502.

Figure 6:
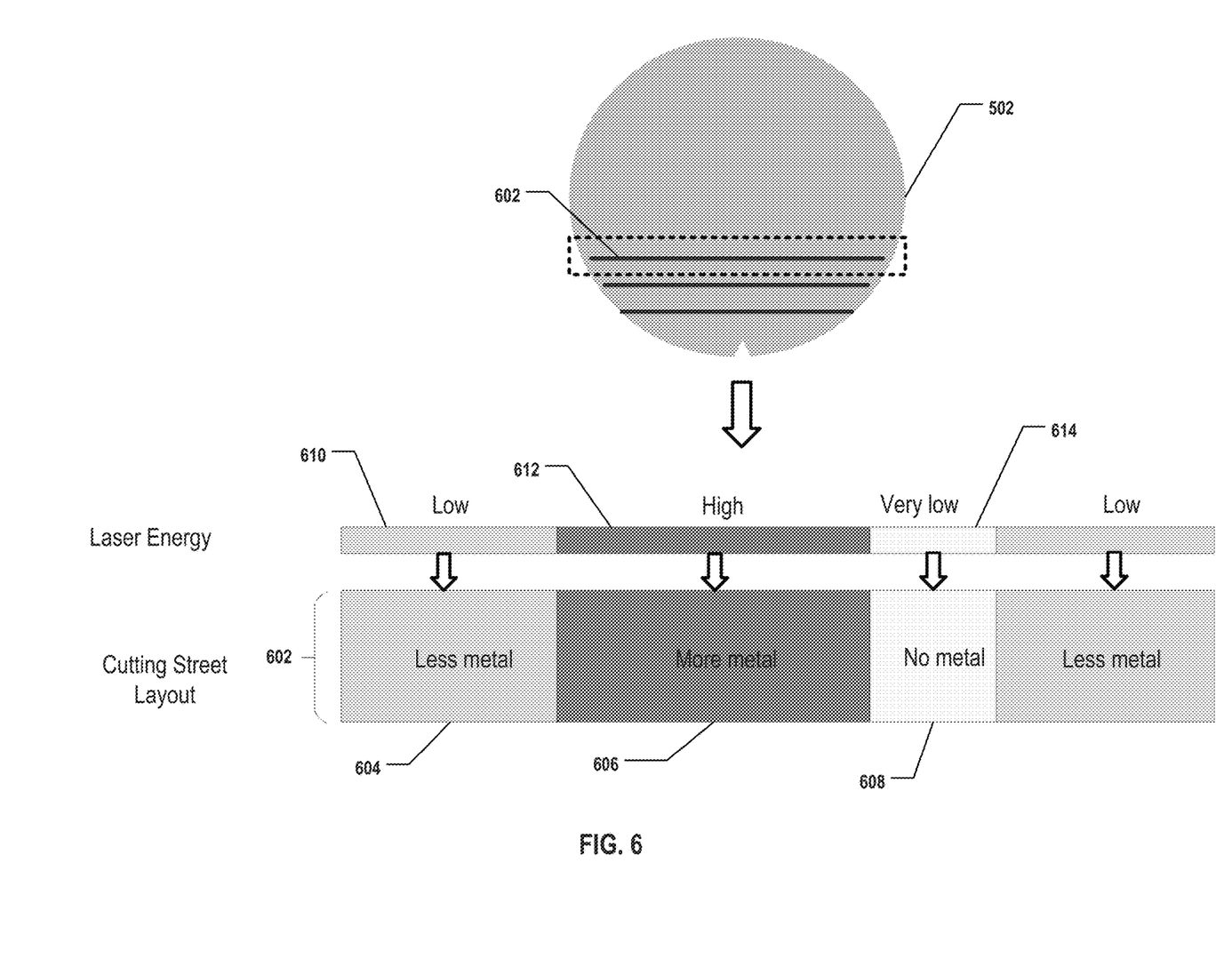
FIG. 6 illustrates a top view of an exemplary cutting street formed on a semiconductor structure, according to some implementations of the present disclosure.

FIG. 6 illustrates a top view of a cutting street 602 formed on semiconductor structure 502, according to some implementations of the present disclosure. In some implementations, the materials of semiconductor structure 502 corresponding to positions along cutting street 602 may be pre-defined and stored in a database or a host device coupled to the laser system. In some implementations, the materials of semiconductor structure 502 corresponding to positions along cutting street 602 may be pre-marked on the semiconductor structure 502, and the laser system may identify the markings.

When laser system 500 moves along cutting street 602 to perform the laser dicing operation, one or more laser energy adjusting unit 510 may be optionally moved to the laser light path between laser source 504 and semiconductor structure 502 according to the information of the materials of semiconductor structure 502 corresponding to positions along cutting street 602.

In some implementations, laser system 500 may include multiple laser energy adjusting units 510 corresponding to the treatments of different materials on different regions of semiconductor structure 502. In some implementations, multiple laser energy adjusting units 510 may include lenses or prisms of different light transmittances. Semiconductor structure 502 may include a plurality of regions formed by a plurality of materials, and one of a plurality of laser energy adjusting units 510 may be moved to the laser light path between laser source 504 and semiconductor structure 502 based on the determination that the laser source is focused on a preset region of semiconductor structure 502.

For example, in some implementations, when the information stored in the database or shown by the markings on semiconductor structure 502 indicates that the material corresponding to a position 604 is a less-metal material, a first laser energy adjusting unit may be moved to the laser light path between laser source 504 and semiconductor structure 502 to reduce the laser energy output by laser source 504. As a result, a dicing energy 610 irradiated on semiconductor structure 502 is a first laser energy.

In some implementations, when the information stored in the database or shown by the markings on semiconductor structure 502 indicates that the material corresponding to a position 606 is a more-metal material, laser energy adjusting unit 510 may be moved away from the laser light path between laser source 504 and semiconductor structure 502. As a result, a dicing energy 612 irradiated on semiconductor structure 502 is the original laser energy output by laser source 504 without weakening and is a second laser energy higher than the first laser energy.

In some implementations, when the information stored in the database or shown by the markings on semiconductor structure 502 indicates that the material corresponding to a position 608 is a less-metal material, a second laser energy adjusting unit may be moved to the laser light path between laser source 504 and semiconductor structure 502 to reduce the laser energy output by laser source 504. As a result, a dicing energy 614 irradiated on semiconductor structure 502 is a third laser energy lower than the first energy.

Figure 7:
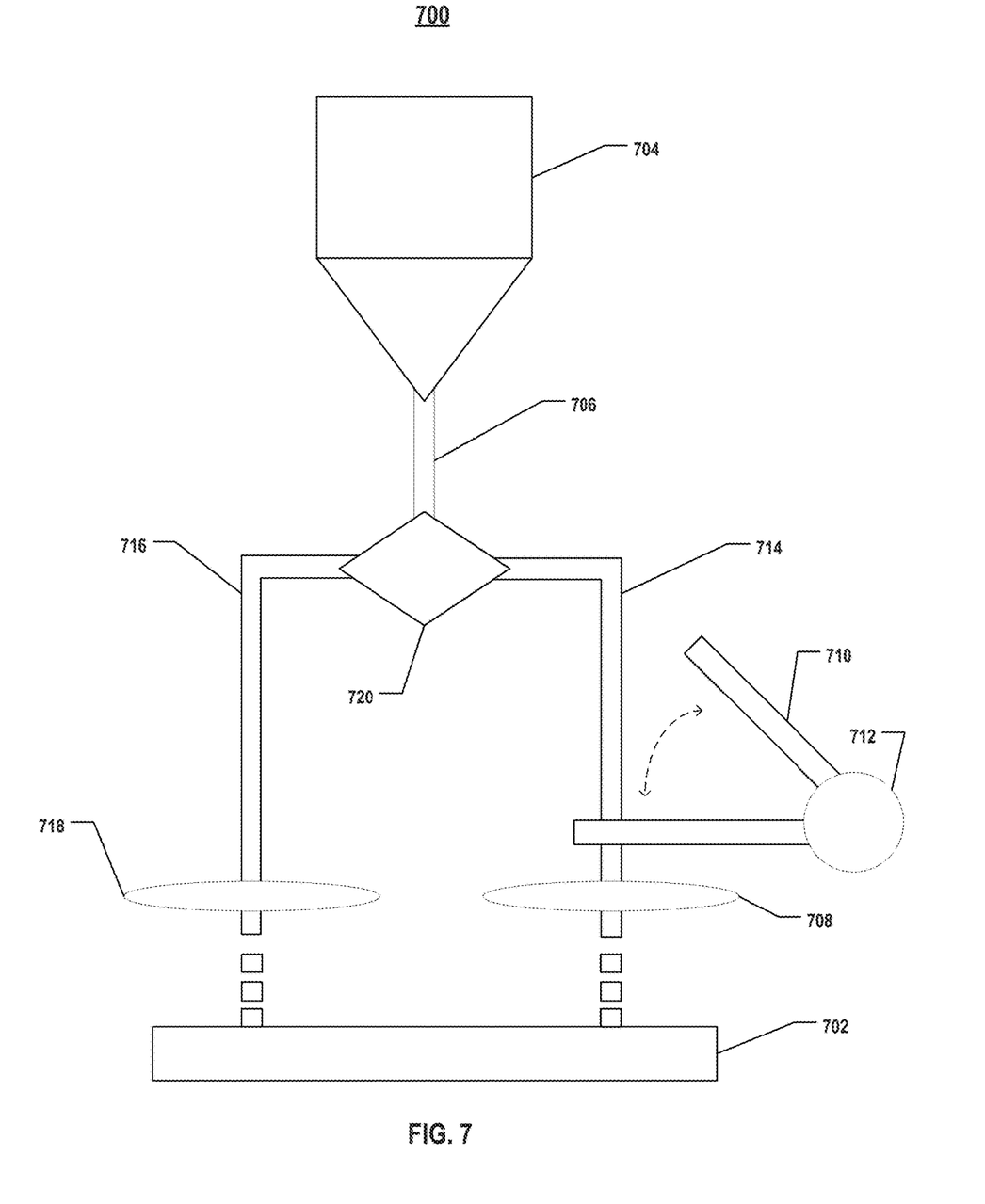
FIG. 7 illustrates a diagram of still another exemplary laser system for dicing a semiconductor structure, according to some implementations of the present disclosure.

The implementations shown in FIG. 6 illustrate the adjustment along the direction of cutting street 602 (x-axis). However, it is understood that the adjustment of the laser energy may also be applied to different laser passes (as shown in FIG. 3) along the y-axis, as shown in FIG. 7. FIG. 7 illustrates a diagram of a laser system 700 for dicing a semiconductor structure 702, according to some implementations of the present disclosure.

Laser system 700 includes a laser source 704, a splitter 720, a laser energy adjusting unit 710, a positioning unit 712, a first focusing unit 708, and a second focusing unit 718. Laser source 704 may be any suitable type of laser source including, but not limited to, fiber lasers, solid-state lasers, gas lasers, and semiconductor lasers. Laser source 704 can be configured to generate a laser beam 706 that includes a series of pulsed lasers at any suitable wavelengths, which should be a permeable wavelength not strongly absorbed or reflected by semiconductor structure 702.

Splitter 720 splits laser beam 706 into a first split laser beam 714 and a second split laser beam 716. Splitter 720 may include an optical device that splits laser beam 706 into two or more than two. In some implementations, splitter 720 may be a cube made from glass prisms. In some implementations, splitter 720 may be a half-silvered mirror having a metallic coating or a dichroic optical coating. In some implementations, splitter 720 may be a dichroic mirrored prism. In some implementations, first split laser beam 714 and second split laser beam 716 may have the same laser energy.

Laser energy adjusting unit 710 may be movably provided on a first laser light path between splitter 720 and the semiconductor structure 702. Laser energy adjusting unit 710 is provided to reduce or weaken the laser energy on the first laser path. In some implementations, laser energy adjusting unit 710 may be a filter capable of reducing the laser energy of first split laser beam 714 by splitter 720 and irradiated on semiconductor structure 702. In some implementations, laser energy adjusting unit 710 may be a plurality of filters, and the filters may be provided separately or together to generate a gradient transitional dicing energy irradiated on semiconductor structure 702. In some implementations, laser energy adjusting unit 710 may be an optical device providing an additional laser light path. By providing the additional laser light path, the first laser light path between splitter 720 and the semiconductor structure 702 is extended. In a situation that the laser energy of laser beam 714 is the same, the total first laser light path between splitter 720 and the semiconductor structure 702 is extended, and therefore a first dicing energy irradiated on semiconductor structure 702 is weakened. In some implementations, laser energy adjusting unit 710 may be a shelter, e.g., a mask or an optical grate, that may block a portion of laser beam 714 to weaken the first dicing energy irradiated on semiconductor structure 702.

Positioning unit 712 is configured to move laser energy adjusting unit 710 to the first laser light path or move laser energy adjusting unit 710 away from the first laser light path. In some implementations, positioning unit 712 may be a motor rotationally moving laser energy adjusting unit 710 to or away from the first laser light path. In some implementations, positioning unit 712 may be a shutter mechanism slidably moving laser energy adjusting unit 710 to or away from the first laser light path.

Focusing units 708 and 718 may be configured to focus first split laser beam 714 and second split laser beam 716 to form a series of focused laser spots. In some implementations, focusing unit 708 or 718 may include one or more focusing lens through which the focal plane of first split laser beam 714 and second split laser beam 716 is determined at a desired position along the z-axis (e.g., the vertical direction). In some implementations, the one or more focusing lenses are electrically and mechanically coupled to the controller to control the arrangement (e.g., orientation and distance in between) of the one or more focusing lens to allow the focal plane of first split laser beam 714 and second split laser beam 716 to be located at the desired position along the z-axis. The series of focused laser spots can be formed on the focal plane, forming dicing trenches in semiconductor structure 702.

Figure 8:
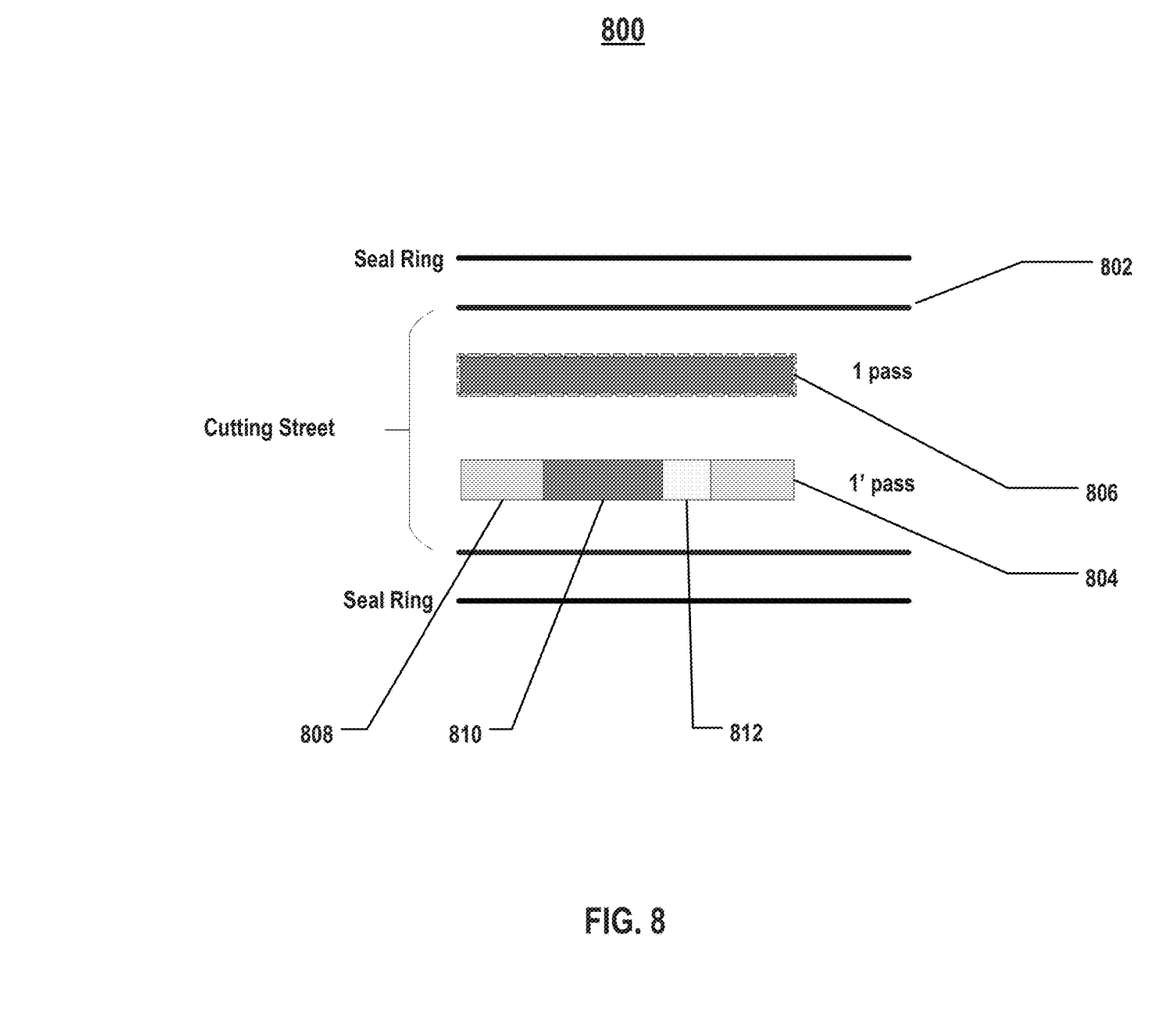
FIG. 8 illustrates a top view of an exemplary cutting street formed on a semiconductor structure, according to some implementations of the present disclosure.

FIG. 8 illustrates a top view 800 of a cutting street 802 formed on semiconductor structure 702, according to some implementations of the present disclosure. A first trench 804 is formed by first split laser beam 714, and a second trench 806 is formed by second split laser beam 716. Since second split laser beam 716 generates the second dicing energy and the second dicing energy is irradiated on semiconductor structure 702 without laser energy adjusting unit 710, trench 806 is form by the same second dicing energy. In other words, when laser system 700 moves along cutting street 802 to perform the laser dicing operation, the second dicing energy of second split laser beam 716 on semiconductor structure 702 along a second track of trench 806 is fixed.

When laser system 700 moves along cutting street 802 to perform the laser dicing operation, one or more laser energy adjusting unit 710 may be optionally moved to the first laser light path between splitter 720 and semiconductor structure 702 according to the information of the materials of semiconductor structure 702 corresponding to positions along cutting street 802.

In some implementations, laser system 700 may include multiple laser energy adjusting units 710 corresponding to the treatments of different materials on different regions of semiconductor structure 702. In some implementations, multiple laser energy adjusting units 710 may include lenses or prisms of different light transmittances. Semiconductor structure 702 may include a plurality of regions formed by a plurality of materials, and one of a plurality of laser energy adjusting units 710 may be moved to the first laser light path between splitter 720 and semiconductor structure 702 based on the determination that first split laser beam 714 is focused on a preset region of semiconductor structure 702.

For example, in some implementations, when the information stored in the database or shown by the markings on semiconductor structure 702 indicates that the material corresponding to a position 808 is a less-metal material, a first laser energy adjusting unit may be moved to the first laser light path between splitter 720 and semiconductor structure 702 to reduce the laser energy of first split laser beam 714. As a result, the first dicing energy irradiated on semiconductor structure 702 at position 808 is a first laser energy.

In some implementations, when the information stored in the database or shown by the markings on semiconductor structure 702 indicates that the material corresponding to a position 810 is a more-metal material, laser energy adjusting unit 710 may be moved away from the first laser light path between splitter 720 and semiconductor structure 702. As a result, the first dicing energy irradiated on semiconductor structure 702 at position 810 is the original laser energy of first split laser beam 714 without weakening and is a second laser energy higher than the first laser energy.

In some implementations, when the information stored in the database or shown by the markings on semiconductor structure 702 indicates that the material corresponding to a position 812 is a less-metal material, a second laser energy adjusting unit may be moved to the first laser light path between splitter 720 and semiconductor structure 702 to reduce the laser energy of first split laser beam 714. As a result, the first dicing energy irradiated on semiconductor structure 702 at position 812 is a third laser energy lower than the first laser energy.

Implementations of the present disclosure use the laser energy adjusting unit to change and control the final output laser beam energy irradiated on the semiconductor structure, e.g., the wafer. The laser beam can change the laser energy irradiated on the semiconductor structure at any time during the laser dicing operation, therefore improves the consistency of the laser grooving shape, and avoid the problems of different trench depths in different positions having different materials.

Figure 9:
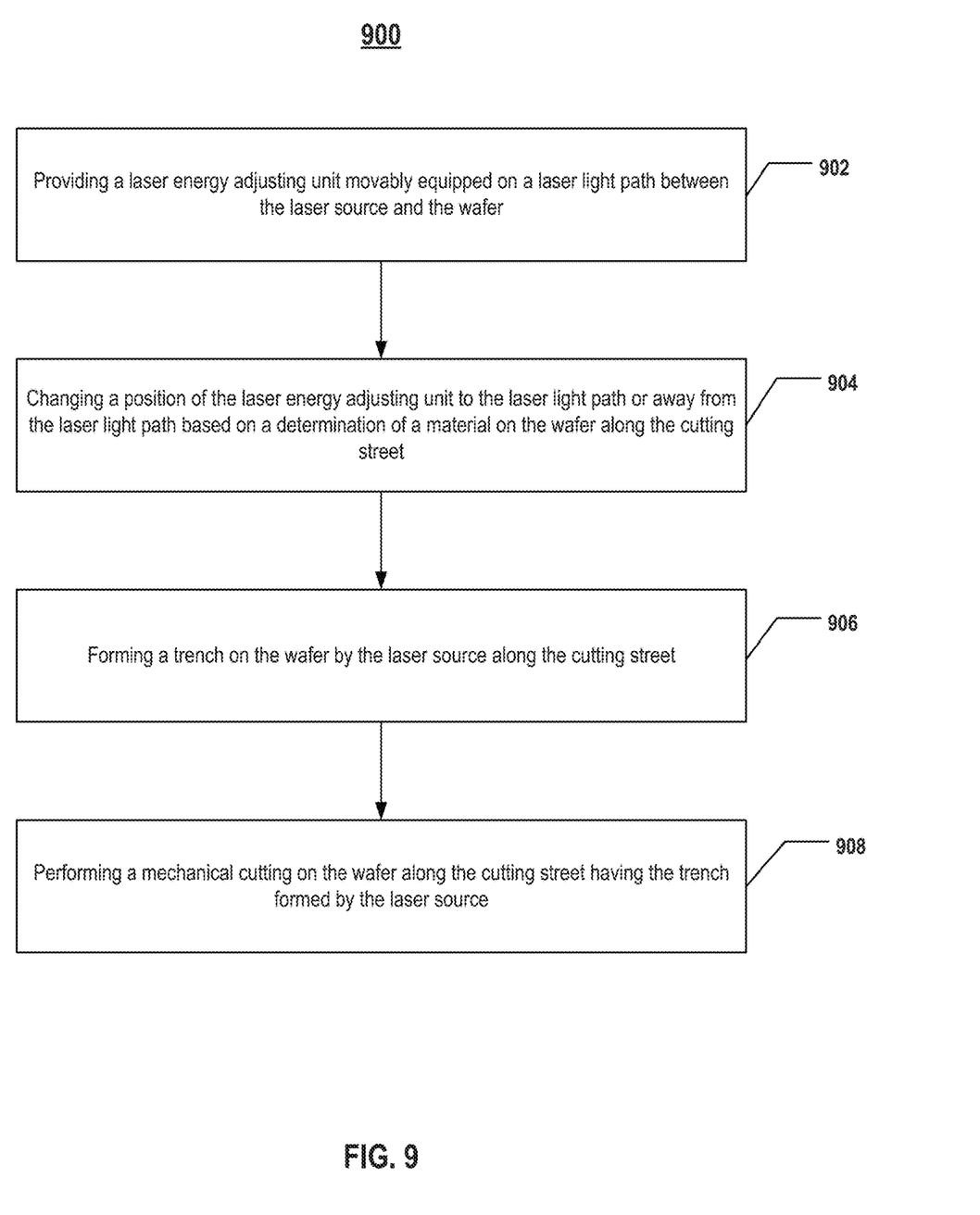
FIG. 9 illustrates a flowchart of a method for dicing a wafer, according to some aspects of the present disclosure.

FIG. 9 illustrates a flowchart of a method 900 for dicing a wafer, according to some aspects of the present disclosure. In operation 902, a laser energy adjusting unit is provided movably equipped on a laser light path between the laser source and the wafer. The laser energy adjusting unit, e.g., laser energy adjusting unit 510 in FIG. 5, may be movably provided on a laser light path between the laser source and the wafer. The laser energy adjusting unit is provided to reduce or weaken the laser energy on the laser path.

In operation 904, a position of the laser energy adjusting unit is changed to the laser light path or away from the laser light path based on a determination of a material on the wafer along the cutting street. In some implementations, the materials of the wafer corresponding to positions along the cutting street may be pre-defined and stored in a database or a host device coupled to the laser system. In some implementations, the materials of the wafer corresponding to positions along the cutting street may be pre-marked on the wafer, and the laser system may identify the markings. When the laser system moves along the cutting street to perform the laser dicing operation, one or more laser energy adjusting unit may be optionally moved to the laser light path between the laser source and the wafer according to the information of the materials of the wafer corresponding to positions along the cutting street.

In operation 906, a trench is formed on the wafer by the laser source along a cutting street. The output energy of the laser source maintains the same when dicing the wafer along the cutting street, and a dicing energy irradiated on the wafer is adjustable when dicing the wafer along the cutting street.

In some implementations, the laser source may be split into a first split laser source and a second split laser source. The first split laser source may generate a first dicing energy, and the first dicing energy may be irradiated on the wafer along a first track in the cutting street, and the second split laser source may generate a second dicing energy, and the second dicing energy may be irradiated on the wafer along a second track in the cutting street parallel to the first track. The first dicing energy irradiated on the wafer along the first track is adjustable, and the second dicing energy irradiated on the wafer along the second track is fixed. The first dicing energy and the second dicing energy are irradiated on the wafer simultaneously.

In operation 908, a mechanical is performed to cut the wafer along the cutting street having the trench formed by the laser source. Since the laser energy adjusting unit is used to change and control the final output laser beam energy irradiated on the wafer, the laser beam may change the laser energy irradiated on the wafer at any time during the laser dicing operation. Therefore, the consistency of the laser grooving shape is improved, and the problems of different trench depths in different positions having different materials are further prevented.

Figure 10:
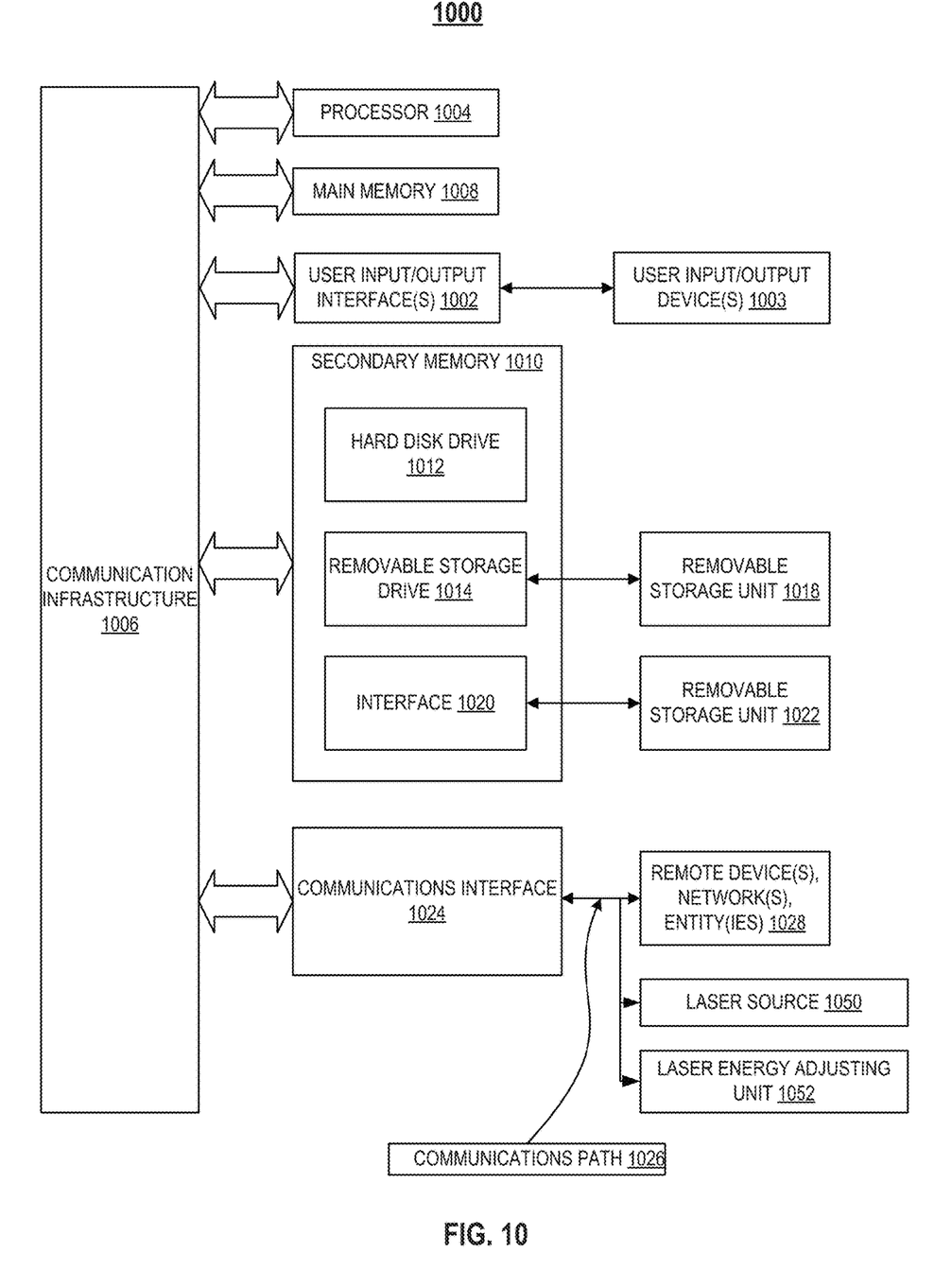
FIG. 10 illustrates a schematic diagram of an exemplary host device, according to some implementations of the present disclosure.

FIG. 10 illustrates a schematic diagram of a host device 1000, according to some implementations of the present disclosure. It is understood that host device 1000 in the present disclosure may be an independent device coupled to the laser source and the laser energy adjusting unit. In some implementations, host device 1000 may be located in the laser source. In some implementations, host device 1000 may be located in the laser energy adjusting unit. The location and connection relationship in FIG. 10 is for illustration purpose only, not for limiting.

One or more host device 1000 can be cooperated with laser system 500 in FIG. 5 or laser system 700 in FIG. 7 to implement method 900 of FIG. 9. Host device 1000 may include one or more processors (also called central processing units, or CPUs), such as a processor 1004. Processor 1004 is connected to a communication infrastructure or bus 1006, according to some implementations. One or more processors 1004 can each be a GPU. In some implementations, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Host device 1000 may also include user input/output device(s) 1003, such as monitors, keyboards, pointing devices, etc., which communicate with communication infrastructure or bus 1006 through user input/output interface(s) 1002. Host device 1000 may also include a main or primary memory 1008, such as random-access memory (RAM). Main memory 1008 can include one or more levels of cache. Main memory 1008 has stored therein control logic (i.e., computer software) and/or data, according to some implementations.

Host device 1000 may also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data, according to some implementations. Removable storage unit 1018 can be a floppy disk, magnetic tape, compact disk, DVD, optical storage disk, and/any other computer data storage device. Removable storage drive 1014 can read from and/or writes to removable storage unit 1018 in a well-known manner.

According to some implementations, secondary memory 1010 can include other means, instrumentalities or other approaches for allowing computer programs and/or other instructions and/or data to be accessed by host device 1000. Such means, instrumentalities or other approaches may include, for example, a removable storage unit 1022 and an interface 1020. Examples of removable storage unit 1022 and interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Host device 1100 may further include a communication or network interface 1024. Communication interface 1024 enables host device 1100 to communicate and interact with any combination of remote devices, remote networks, remote entities, etc. (individually and collectively referenced by reference number 1028), according to some implementations. For example, communication interface 1024 may allow host device 1000 to communicate with remote devices 1028 over communications path 1026, which may be wired and/or wireless, and which may include any combination of LANs, WANs, the Internet, etc. Control logic and/or data may be transmitted to and from host device 1000 via communication path 1026.

Further, communication interface 1024 enables host device 1100 to communicate a laser source 1050 and a laser energy adjusting unit 1052 to control and coordinate the moving of laser energy adjusting unit 1052 between laser source 1050 and the semiconductor structure. In some implementations, host device 1000 may be an independent device coupled to laser source 1050 and laser energy adjusting unit 1052 through communication interface 1024. In some implementations, host device 1000 may be located in laser source 1050. In some implementations, host device 1000 may be located in laser energy adjusting unit 1052.

In some implementations, laser energy adjusting unit 1052 may include communication interface 1024 to communicate with other device through communication path 1026. For example, laser energy adjusting unit 1052 may be coupled to laser source 1050, host device 1000 or other device to receive a comment to move laser energy adjusting unit 1052 and perform the laser dicing operation.

According to one aspect of the present disclosure, a laser system for dicing a semiconductor structure is disclosed. The laser system includes a laser source and a laser energy adjusting unit. The laser source is configured to generate a laser. The laser energy adjusting unit is movably provided on a laser light path between the laser source and the semiconductor structure. The laser energy adjusting unit is moved to the laser light path between the laser source and the semiconductor structure based on a first determination that the laser source is focused on a first preset region of the semiconductor structure having a first material.

In some implementations, the laser energy adjusting unit is moved away from the laser light path based on a second determination that the laser source is focused on a second preset region of the semiconductor structure having a second material. In some implementations, the first preset region and the second preset region are located along a cutting street on the semiconductor structure. In some implementations, a first dicing energy irradiated on the first preset region by the laser system is lower than a second dicing energy irradiated on the second preset region by the laser system. In some implementations, an output energy of the laser source maintains the same when dicing the semiconductor structure along the cutting street.

In some implementations, a positioning unit is configured to move the laser energy adjusting unit to the laser light path and move the laser energy adjusting unit away from the laser light path. In some implementations, the laser energy adjusting unit includes at least one filter to reduce the first dicing energy irradiated on the first preset region by the laser system. In some implementations, the at least one filter reduces the first dicing energy to generate a gradient transitional dicing energy. In some implementations, the laser energy adjusting unit has an additional laser light path, and the additional laser light path and the laser light path are combinedly provided between the laser source and the semiconductor structure. In some implementations, the laser energy adjusting unit includes a shelter to reduce the first dicing energy irradiated on the first preset region by the laser system.

In some implementations, a focusing unit is deposited between the laser energy adjusting unit and the semiconductor structure to focus the first dicing energy irradiated on the first preset region. In some implementations, a focusing unit is deposited between the laser source and the semiconductor structure to focus the second dicing energy irradiated on the second preset region.

According to another aspect of the present disclosure, a laser system for dicing a semiconductor structure is disclosed. The laser system includes a laser source, a splitter and a laser energy adjusting unit. The laser source is configured to generate a laser. The splitter splits the laser source into a plurality of split laser sources, and the plurality of split laser sources include a first split laser source and a second split laser source. The laser energy adjusting unit is movably provided on a first laser light path between the first split laser source and the semiconductor structure. The first split laser source generates a first dicing energy irradiated on the semiconductor structure along a first track, the second split laser source generates a second dicing energy irradiated on the semiconductor structure along a second track parallel to the first track, and the first track and the second track are located in a cutting street. The first dicing energy irradiated on the semiconductor structure along the first track is adjustable.

In some implementations, the first dicing energy and the second dicing energy are irradiated on the semiconductor structure simultaneously. In some implementations, the second dicing energy irradiated on the semiconductor structure along the second track is fixed. In some implementations, the laser energy adjusting unit is moved to the first laser light path between the first split laser source and the semiconductor structure based on a first determination that the first split laser source is focused on a first preset region of the semiconductor structure having a first material.

In some implementations, the laser energy adjusting unit is moved away from the first laser light path between the first split laser source and the semiconductor structure based on a second determination that the first split laser source is focused on a second preset region of the semiconductor structure having a second material. In some implementations, the first dicing energy irradiated on the first preset region by the first split laser source is lower than the first dicing energy irradiated on the second preset region by the first split laser source. In some implementations, a positioning unit is configured to move the laser energy adjusting unit to the first laser light path and move the laser energy adjusting unit away from the first laser light path.

In some implementations, the laser energy adjusting unit includes at least one filter to reduce the first dicing energy irradiated on the first preset region by the first split laser source. In some implementations, the at least one filter reduces the first dicing energy to generate a gradient transitional dicing energy. In some implementations, the laser energy adjusting unit has an additional laser light path, and the additional laser light path and the first laser light path are combinedly provided between the first split laser source and the semiconductor structure. In some implementations, the laser energy adjusting unit includes a shelter to reduce the first dicing energy irradiated on the first preset region by the first split laser source.

In some implementations, a focusing unit is deposited between the laser energy adjusting unit and the semiconductor structure to focus the first dicing energy irradiated on the first preset region. In some implementations, a focusing unit is deposited between the first split laser source and the semiconductor structure to focus the first dicing energy irradiated on the second preset region.

According to still another aspect of the present disclosure, a method for dicing a wafer is disclosed. A trench is formed on the wafer by a laser source along a cutting street. An output energy of the laser source maintains the same when dicing the wafer along the cutting street, and a dicing energy irradiated on the wafer is adjustable when dicing the wafer along the cutting street. A mechanical cutting is performed on the wafer along the cutting street having the trench formed by the laser source.

In some implementations, a laser energy adjusting unit is provided movably equipped on a laser light path between the laser source and the wafer, and a position of the laser energy adjusting unit is changed to the laser light path or away from the laser light path based on a determination of a material on the wafer along the cutting street.

In some implementations, the laser source is split into a plurality of split laser sources, and the plurality of split laser sources include a first split laser source and a second split laser source. A first dicing energy generated by the first split laser source is irradiated on the wafer along a first track in the cutting street, and a second dicing energy generated by the second split laser source is irradiated on the wafer along a second track in the cutting street parallel to the first track.

In some implementations, the first dicing energy irradiated on the wafer along the first track is adjustable, and the second dicing energy irradiated on the wafer along the second track is fixed. In some implementations, the first dicing energy and the second dicing energy are irradiated on the wafer simultaneously.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A laser system for dicing a semiconductor structure, comprising:
a laser source configured to generate laser; and
a laser energy adjusting unit movably provided on a laser light path between the laser source and the semiconductor structure,
wherein:
when the laser energy adjusting unit is moved away from the laser light path between the laser source and the semiconductor structure, energy irradiated on the semiconductor structure corresponds to original laser energy outputted by the laser source; and
when a positioning unit tilts the laser energy adjusting unit from a first location having an angle relative to a surface of the semiconductor structure to a second location parallel to the surface of the semiconductor structure to arrange the laser energy adjusting unit on the laser light path between the laser source and the semiconductor structure based on a first determination that the laser is focused on a first preset region of the semiconductor structure having a first material, the original energy is reduced by the laser energy adjusting unit on the laser light path to have a first dicing energy irradiated on the first preset region of the semiconductor structure.

2. The laser system of claim 1, wherein the laser energy adjusting unit is moved away from the laser light path based on a second determination that the laser source is focused on a second preset region of the semiconductor structure having a second material.

3. The laser system of claim 2, wherein the first preset region and the second preset region are located along a cutting street on the semiconductor structure.

4. The laser system of claim 3, wherein a first dicing energy irradiated on the first preset region by the laser system is lower than a second dicing energy irradiated on the second preset region by the laser system.

5. The laser system of claim 3, wherein an output energy of the laser source maintains the same when dicing the semiconductor structure along the cutting street.

6. The laser system of claim 1, further comprising:
the positioning unit configured to move the laser energy adjusting unit to the laser light path and move the laser energy adjusting unit away from the laser light path.

7. The laser system of claim 1, wherein;
the laser energy adjusting unit comprises at least one filter.

8. The laser system of claim 7, wherein the at least one filter is configured to reduce the original energy to generate a gradient transitional dicing energy.

9. The laser system of claim 1, wherein:
the laser light path is a first laser light path; and
the laser energy adjusting unit comprises a second laser light path different from the first laser light path, and the second laser light path is provided when the laser energy adjusting unit is arranged between the laser source and the semiconductor structure.

10. The laser system of claim 1, wherein;
the laser energy adjusting unit comprises a shelter.

11. The laser system of claim 1, further comprising:
a focusing unit deposited between the laser energy adjusting unit and the semiconductor structure to have the first dicing energy focused and irradiated on the first preset region of the semiconductor structure.

12. The laser system of claim 1, further comprising:
a focusing unit deposited between the laser source and the semiconductor structure to have a second dicing energy focused and irradiated on a second preset region of the semiconductor structure, the second preset region being different from the first preset region.

13. The laser system of claim 2, wherein:
the first material comprises a first amount of metal; and
the second material comprises a second amount of metal, the first amount being less than the second amount.

14. A laser system, comprising:
a laser source configured to generate laser to dice a semiconductor structure;

a laser energy adjusting unit configured to adjust laser energy between a first laser energy and a second laser energy; and a positioning unit configured to rotate the laser energy adjusting unit between a first angle and a second angle formed relative to a surface of the semiconductor structure, the first angle being different from the second angle, wherein:

the laser system is configured to move along a cutting street on the semiconductor structure, the cutting street comprising a first preset region and a second preset region in a line on the semiconductor structure;

when the laser system moves at the first preset region, the laser energy adjusting unit is configured to move to a first location having the first angle, where the laser outputted by the laser source goes through the laser energy adjusting unit between the laser source and the semiconductor structure and reaches the first preset region on the semiconductor structure, a first laser energy being irradiated on the first preset region of the semiconductor structure; and when the laser system moves at the second preset region, the laser energy adjusting unit is configured to move to a second location having the second angle, where the laser energy adjusting unit is away from a laser light path between the laser source and the semiconductor structure, the second laser energy being irradiated on the second preset region of the semiconductor structure, and the second laser energy being greater than the first laser energy.

15. The laser system of claim 14, wherein:
the first preset region of the semiconductor structure comprises a first material; and
the second preset region of the semiconductor structure comprises a second material different from the first material.

16. The laser system of claim 15, wherein:
the first material comprises a first amount of metal; and
the second material comprises a second amount of metal, the first amount being less than the second amount.

17. The laser system of claim 14, wherein the laser energy adjusting unit comprises a filter configured to reduce laser energy outputted by the laser source when the the laser energy adjusting unit is arranged between the laser source and the semiconductor structure.

18. The laser system of claim 14, wherein the laser energy adjusting unit comprises an optical device configured to extend the laser light path between the laser source and the semiconductor structure when the laser energy adjusting unit is arranged between the laser source and the semiconductor structure.

19. The laser system of claim 14, wherein an energy outputted by the laser source maintains at a constant.

20. The laser system of claim 14, wherein the laser system is configured to move along the line corresponding to the cutting street to form one or more trenches at preset regions along the cutting street, the preset regions comprising the first preset region and the second preset region.

* * * * *